United States Patent [19]

Barker et al.

[11] 4,387,925
[45] Jun. 14, 1983

[54] BICYCLE SEAT

[75] Inventors: Joel A. Barker, West St. Paul, Minn.; Jeffrey Birch, Charlotte, N.C.

[73] Assignee: J. B. Two Corporation, Minneapolis, Minn.

[21] Appl. No.: 164,697

[22] Filed: Jun. 30, 1980

[51] Int. Cl.³ .............................................. B62J 1/00
[52] U.S. Cl. ...................................... 297/201; 297/195
[58] Field of Search ................ 297/195, 200, 201, 214

[56] References Cited

U.S. PATENT DOCUMENTS

| 537,376 | 4/1895 | Wright et al. | 297/201 |
| 564,588 | 7/1896 | Burgess | 297/201 |
| 576,192 | 2/1897 | Hoyt | 297/201 |
| 591,330 | 10/1897 | Downes | 297/201 |
| 604,347 | 5/1898 | Bray | 297/201 |
| 606,818 | 7/1898 | Best | 297/201 |
| 608,089 | 7/1898 | Wellmann | 297/201 |
| 619,204 | 2/1889 | Moore | 297/201 |
| 620,620 | 3/1899 | Upson | 297/201 |
| 621,140 | 3/1899 | Reuter | 297/201 |
| 642,191 | 1/1900 | Wright | 297/201 |

FOREIGN PATENT DOCUMENTS

| 358585 | 2/1906 | France | 297/201 |
| 360232 | 4/1906 | France | 297/201 |
| 403707 | 11/1909 | France | 297/201 |
| 20112 | of 1895 | United Kingdom | 297/201 |
| 23321 | of 1895 | United Kingdom | 297/201 |

Primary Examiner—J. Franklin Foss
Assistant Examiner—Peter A. Aschenbrenner
Attorney, Agent, or Firm—Merchant, Gould, Smith, Edell, Welter & Schmidt

[57] ABSTRACT

A bicycle seat including two support portions immovably mounted on a support member. The top surface is curved in a particular manner.

3 Claims, 10 Drawing Figures

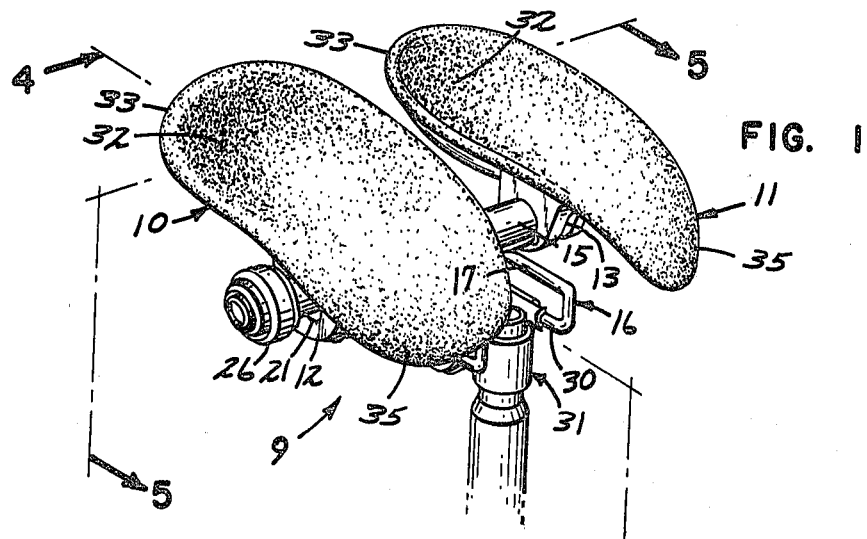
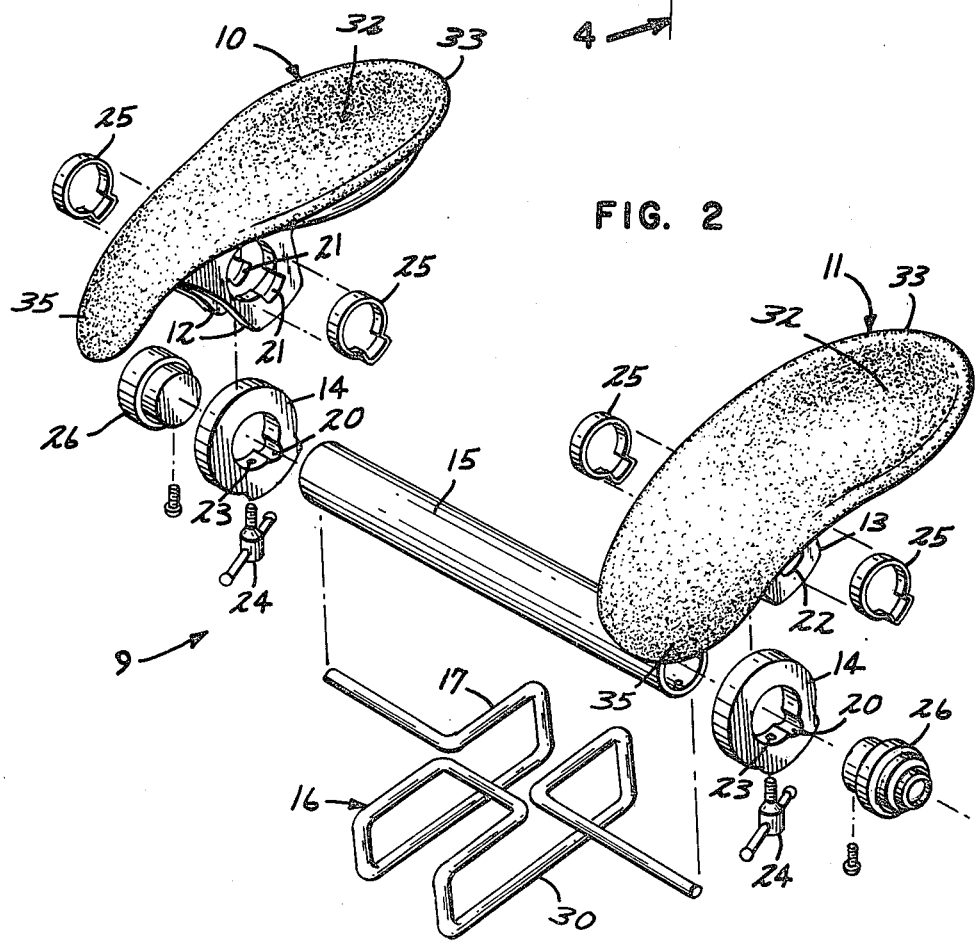

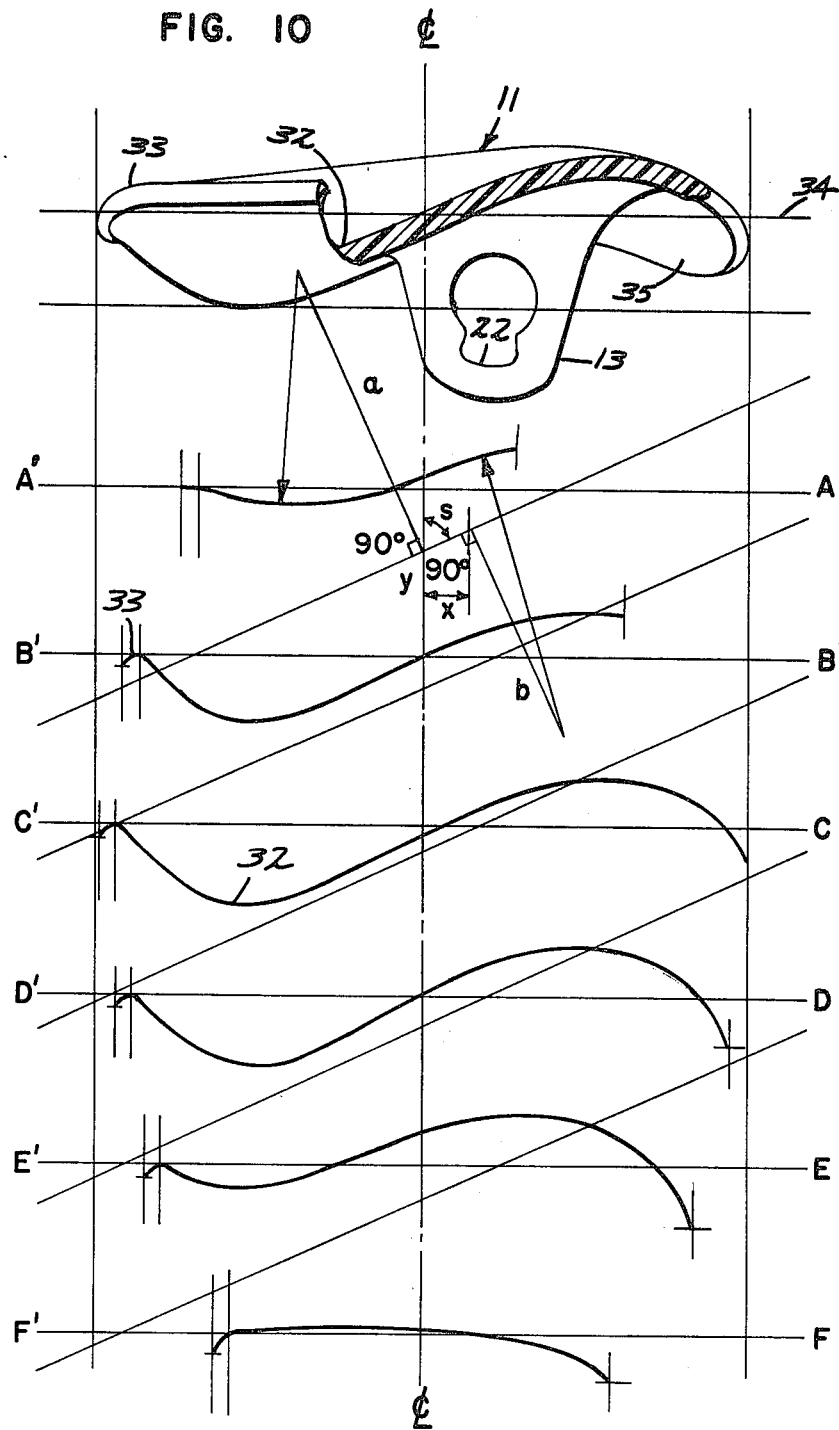

BICYCLE SEAT

TECHNICAL FIELD OF THE INVENTION

The present invention relates in general to bicycle seats and in particular to bicycle seats which support the rider with two separate support surfaces.

BACKGROUND OF THE INVENTION

Bicycles have been used in this country and throughout the world for many years. They provide recreation, exercise, and are convenient means of transportation for short trips. Over the course of the many years of the bicycle's existence, there have been many structural changes streamlining its design and improving its efficiency. The result is that today we have sleek, lightweight and fast bicycles which are capable of efficiently transferring the energy from the bicycle rider's legs to the wheels of the bicycle. Unfortunately, the design of bicycle seats, although streamlined, have not evolved to provide the bicycle rider with the degree of comfort which is desired and needed.

The problem with conventional bicycle seats is that they do not provide support for the rider where it is needed. Most of the support from these seats is centered on the sub scrotal area. Use of this type of seat design continuously over a long period of time can cause ureathal damage and penile numbness. In order to avoid these undesirable side effects which stem from use of the conventional bicycle seat, it would be desirable to have a bicycle seat which shifted the support and consequent pressure away from the sub scrotal area to the ishium of the inferior ramus of the pelvic bone. These are the main bones which normally support the body in a sitting position and are consequently better suited to take the pressure from the bicycle seat.

This problem has been recognized in the past and there has been a number of attempts to design a bicycle seat which would provide support where it is most needed. The problem with these prior attempts at improving the structural design of the bicycle seat is that it was never recognized that in order to maximize the comfort and efficiency of the seat it is necessary to design the seat so that the weight of the bicycle rider is uniformly distributed over the entire surface of the seat. This uniform weight distribution eliminates any areas of high pressure on the rider and causes an increase in both long and short term comfort.

BRIEF SUMMARY OF THE INVENTION

Disclosed is a bicycle seat providing improved comfort for the bicycle rider. It consists of a seat mounting means which mates with a bicycle seat mounting clamp. The mounting means includes a horizontal mounting member to which two support portions are movably connected. The surface of the support portions are shaped to generally conform to the shape of a human body in the region of the ischium and upper femur. The support portions have a limited amount of free tilting movement about the axis of the horizontal mounting member to enable unobstructed pedaling motion of the legs. A lateral positioning means is provided to enable the support portions to be positioned along the lateral surface of the horizontal mounting member enabling the seat to be positioned to accommodate the size and shape of different bicycle riders.

BRIEF DESCRIPTION OF THE DRAWINGS

FIG. 1 is a perspective view of the bicycle seat as it is attached to a standard bicycle mounting clamp.

FIG. 2 is an exploded view of the bicycle seat showing its various component parts.

FIG. 10 is a multiple sectional view showing the shape of the top surface of the support portion along longitudinal section lines A—A' to F—F'.

DETAILED DESCRIPTION OF THE INVENTION

Figure 6:
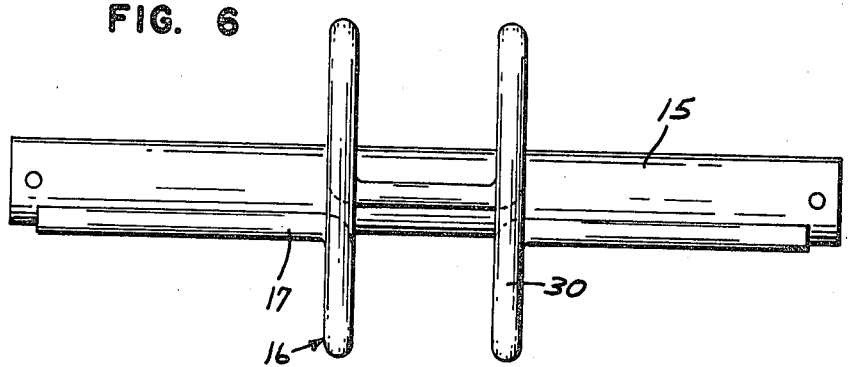
FIG. 6 is a bottom plan view of the bicycle seat mounting assembly.
Figure 7:
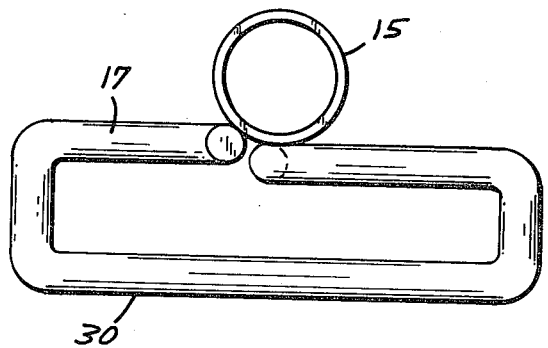
FIG. 7 is a side plan view of the bicycle seat mounting assembly.

The construction of the bicycle seat can be best understood with reference to FIGS. 1 and 2. The bicycle seat 9 comprises two support portions 10 and 11. The surface of each support portion 10 and 11 is shaped to conform generally to the human anatomy in the buttock and upper leg region in a manner that will be described more fully hereinafter. Support portions 10 and 11 are both integrally formed and include lower apertured attachment flanges 12 and 13 respectively, which are split into two identical portions. Locking rings 14, which are inserted between the identical portions of attachment flanges 12 and 13, provide the connections allowing support portions 10 and 11 to be secured to a horizontal mounting member 15. Horizontal mounting member 15 is permanently attached to the upper portion 17 of frame member 16 in any conventional manner such as by welding. The combination of horizontal mounting member 15 and frame member 16 forms the bicycle seat mounting assembly which is more clearly seen in FIGS. 6 and 7.

Figure 4:
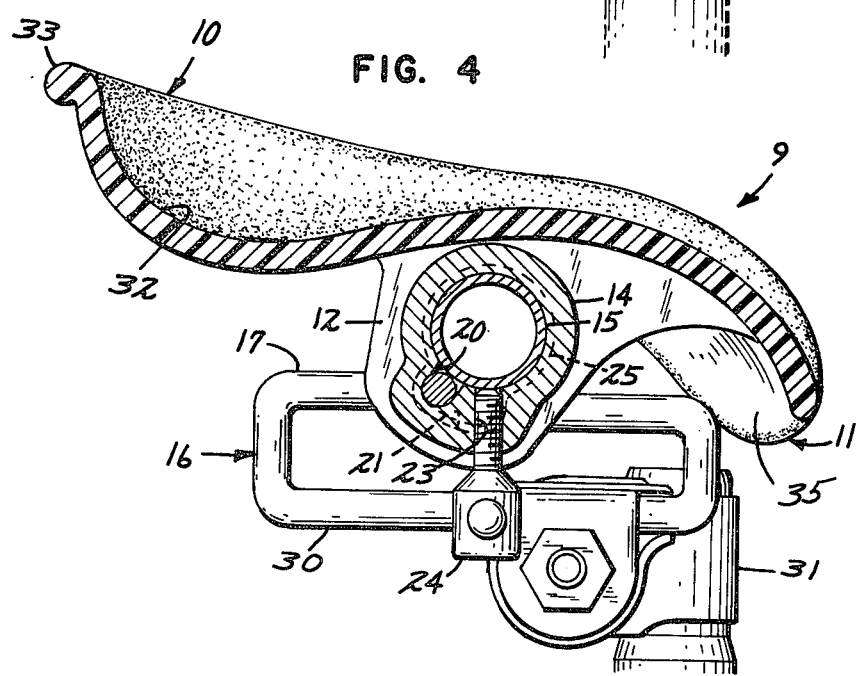
FIG. 4 is a sectional view of the bicycle seat taken generally along the line 4—4 of FIG. 1.

In FIG. 2 it can be seen that locking rings 14 are provided with a slot 20. Attachment flanges 12 and 13 are provided with larger width slots 21 and 22 respectively. The provision of these slots allows attachment flanges 12 and 13 and locking rings 14 to fit over horizontal mounting member 15 and frame member 16 so that support portions 10 and 11 can be permanently mounted. It can be seen that frame member 16 fits into slots 20 of locking rings 14. Frame member 16 also rests in slots 21 and 22 of attachment flanges 12 and 13 respectively. This provision allows support members 10 and 11 to be set at a desired position along the lateral surface of mounting member 15 in conformity with the size of a particular bicycle rider. In order to lock support portions 10 and 11 in a fixed position, locking rings 14 contain threaded holes 23 which accept a mating lock bolt 24. When support portions 10 and 11 are placed in a desired position lock bolts 24 can be tightened until they contact the lateral surface of horizontal mounting member 15 as seen in FIG. 4. This enables support portions 10 and 11 to be secured in any desired position.

Figure 3:
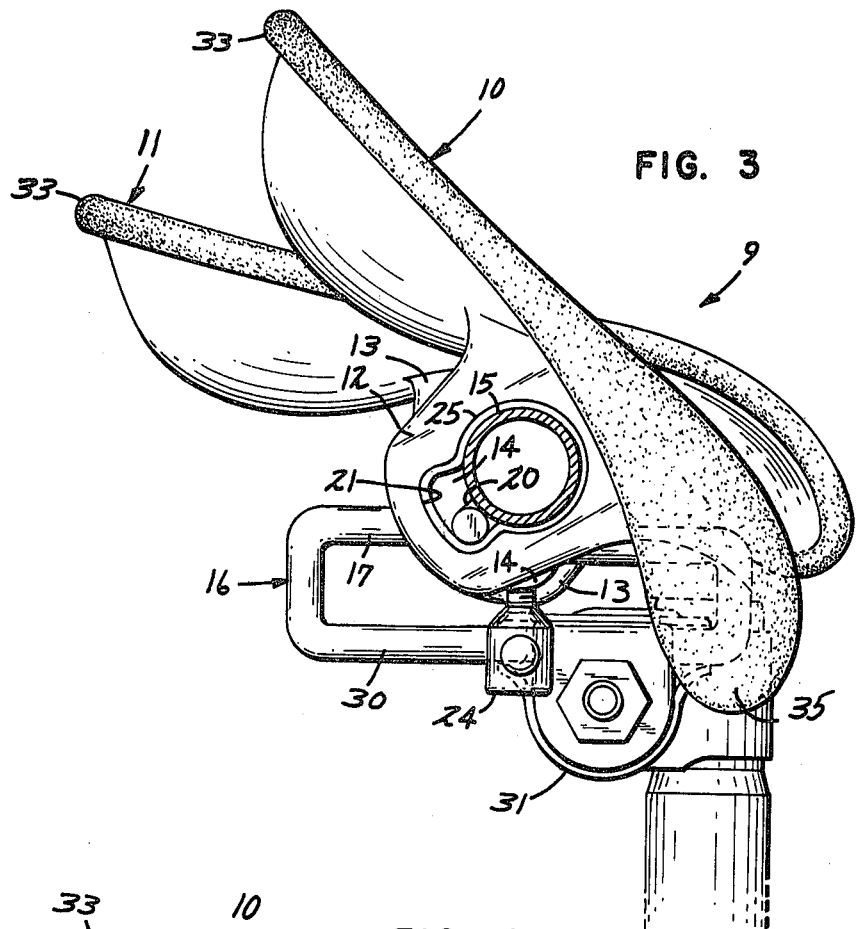
FIG. 3 is a side plan view of the bicycle seat showing one of the support positions in the downwardly tilted position.

Slots 21 and 22 provided in attachment flanges 12 and 13 respectively allow support portions 10 and 11 to rotate a limited amount about horizontal mounting member 15. The amount of this rotational or tilting movement is determined by the size of slots 21 and 22 as seen in FIG. 3. In the preferred embodiment this rotation is 20°. This movement of the support portions is desirable in that it allows freer movement of the legs of the bicycle rider. Inserts 25 may be optionally provided to reduce the frictional wear on attachment flanges 12 and 13. However, if the materials used are self-lubricating, inserts 25 are not needed.

For added safety, improved appearance and greater protection of the bicycle seat, end caps 26 are provided for attachment to the ends of horizontal mounting member 15. End caps 26 provide protection for both the bicycle seat and the rest of the bicycle should the bicycle happen to fall on its side.

Figure 5:
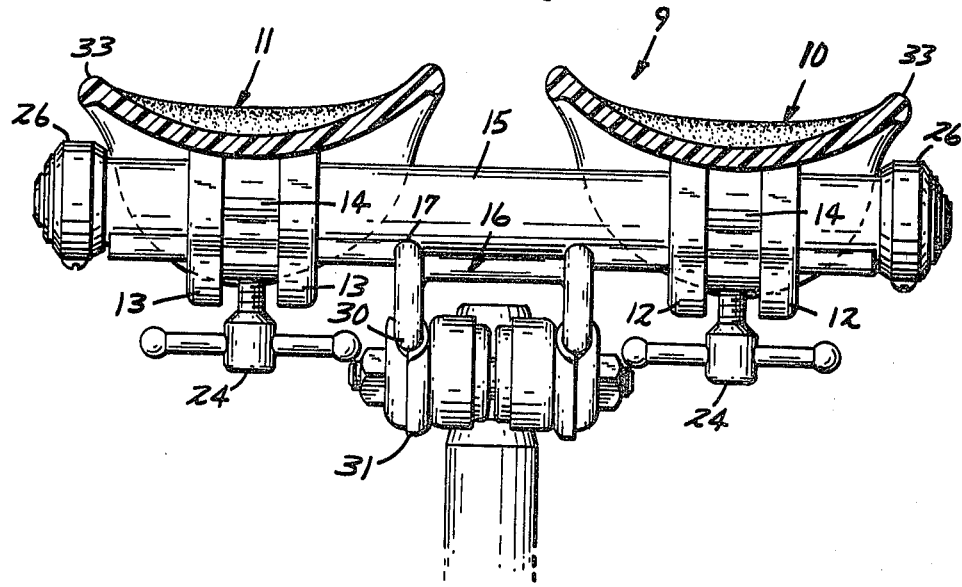
FIG. 5 is a sectional view of the bicycle seat taken generally along the line 5—5 of FIG. 1 showing the seat's attachment to a standard bicycle mounting clamp.

In FIG. 5 the attachment of the bicycle seat to a bicycle seat mounting clamp 31 can be seen. As shown, frame member 16 includes a lower portion 30 which is made to accommodate a standard bicycle clamp 31 so that no special modifications are necessary in order to install the seat upon a conventional bicycle.

The particular shape of support portions 10 and 11 is seen from a variety of positions in FIGS. 1 through 5. The surface configuration is of particular importance to this invention in that the shape has been derived so that the weight of the rider is distributed uniformly over the entire surface of support portions 10 and 11. This particular shape eliminates any high pressure points which could cause either long or short term rider discomfort. Thus, the bicycle seat not only eliminates undue pressure to the sub scrotal area by providing two split support portions but, by providing the particular and critical shape of the surface area of the support portions 10 and 11, eliminates any other areas of high pressure which could cause discomfort.

The typical single support surface bicycle seat in use today provides approximately 27 square inches of support surface for the rider. My improved bicycle seat preferably provides approximately 22 square inches of support per each support portion 10 and 11, for a total of 44 square inches of support. However, this fact alone will not, in itself, provide the increased comfort desired. In order to make efficient use of the increased support area the surface must be shaped so that the weight of the rider is uniformly distributed over the entire surface. For maximum comfort the ratio between the highest pressure and the lowest pressure should be as small as possible.

In order to obtain the proper surface shape for support portions 10 and 11 it is necessary to conform the shapes as much as possible to the shape of the human skeleton in the region of the ischium and upper femur, the bones which are actually supported by the seat. The human anatomy varies from individual to individual and it is obviously impossible to contour one seat will match exactly each of the different shapes. However, it has been found that a seat derived from an understanding of the human anatomy will provide the necessary uniform support and comfort for all body shapes.

Figure 9:
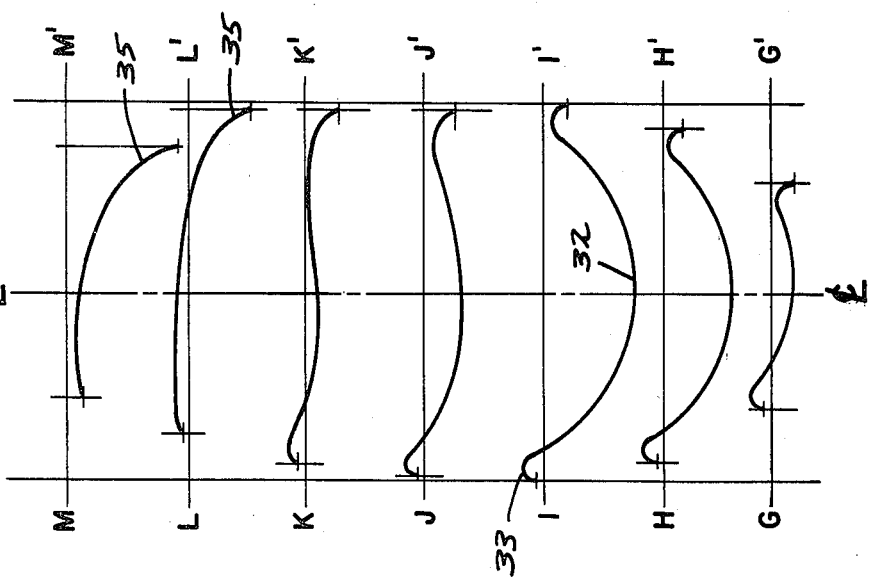
FIG. 9 is a multiple sectional view showing the shape of the top surface of the support portion along transverse section lines G—G' to M—M'.
Figure 8:
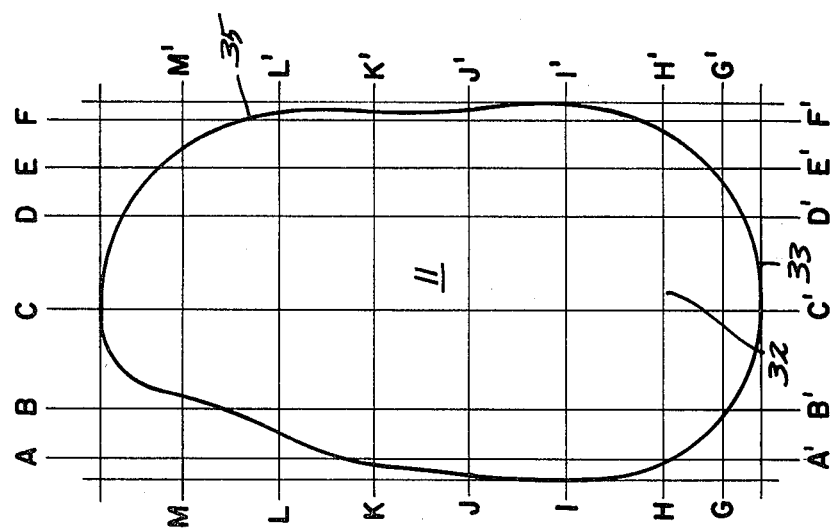
FIG. 8 is a top plan view of one support portion of the seat with a graphical grid overlaid indicating transverse section lines G—G' through M—M' and longitudinal section lines A—A' through F—F'.

The particular shape of the surface of support portions 10 and 11 is best illustrated in FIGS. 8, 9, and 10. The scale of these figures is 1 inch equals 1.57 inches. In FIG. 8 support portion 11 is shown in a top plan view with a graphical grid overlaid. The grid is divided into longitudinal section lines A—A' through F—F' and transverse section lines G—G' through M—M'. The grid is contained within a single reference plane 34.

FIG. 9 is a multiple sectional view showing the surface shape of support portion 11 along each of transverse sectional lines G—G' through M—M'. FIG. 10 is a multisectional view of support portion 11 showing the configuration of the top surface along longitudinal sectional lines A—A' through F—F'. The transverse and longitudinal sectional views shown in FIGS. 9 and 10 generally define the surface contour of support portion 11. It will be appreciated that there are portions of the surface area of support portion 11 which are not located on the sectional lines. The surface changes gradually between the sectional views thus defining an overall gradually contoured surface configuration.

Although FIGS. 8, 9, and 10 define the surface configuration of only support portion 11 it will be appreciated that the surface of support portion 10 has the same configuration except that it is a mirror image of support portion 11. FIGS. 8, 9, and 10 thus define the surface configuration for the preferred embodiment of bicycle seat 9. It should be noted that various modifications may be made to the surface configuration of bicycle seat 9 within the spirit and scope of this invention. For example, it is possible to vary the degree of radius of curvature of the arcs forming the longitudinal and transverse sectional views in FIGS. 9 and 10, thus modifying the general surface configuration but still retaining the general shape of the bicycle seat of this invention. The degree of curvature of these arcs may be varied providing the radius at any given point is within ±20% of the radius shown on the respective sectional line.

This particular surface configuration allows the weight of the bicycle rider to be evenly distributed. High pressure points are minimized. Another important aspect of the seat lies in fallaway portion 35 as seen in FIGS. 8, 9, and 10. Fallaway portion 35 allows the rider unobstructed pedaling movement of his legs. Thus, the rider may operate the bicycle both comfortably and efficiently.

What is claimed is:

1. A bicycle seat including a pair of support platforms and means for mounting said support platforms on a bicycle, each of said platforms being a mirror image of the other, each of said support platforms including an upwardly facing cup-like portion for supporting engagement with one of a bicycle rider's buttocks and a convex downwardly and forwardly extending portion for supporting engagement with the upper leg portion of the rider, said support platforms being pivotable with respect to each other, whereby a person riding a bicycle including said seat may sit with one buttock resting in each cup-like portion and one upper leg portion resting on each of said convex portions and whereby the rider may pedal the bicycle with the rider's weight consistently and uniformly distributed along each of said cup-like portions and convex portions.

2. The bicycle seat of claim 1 wherein said support platforms each provide approximately 22 square inches of support area.

3. A bicycle seat comprising:

a pair of support portions pivotally mounted on a horizontal mounting bar, said mounting bar being adapted for attachment to a bicycle, said pivotal mounting providing said support portions with a limited amount of free tilting movement about the axis of the horizontal mounting bar to permit unobstructed pedaling motion of the legs, the shape of the upper surface of said support portions conforming to the shape of a human body in the buttock and upper leg region, said upper surface including a concave spherical portion integrally connected to a convex forwardly and downwardly extending portion, said spherical portion serving to support the buttocks and the convex portion serving to support the upper leg portion of the rider.

* * * * *